United States Patent
Yamamoto

[11] Patent Number: 5,914,486
[45] Date of Patent: Jun. 22, 1999

[54] COLOR IMAGE READER

[75] Inventor: Yasuhiro Yamamoto, Tokyo, Japan

[73] Assignee: Asahi Kogaku Kogyo Kabushiki Kaisha, Tokyo, Japan

[21] Appl. No.: 08/917,368

[22] Filed: Aug. 26, 1997

[30] Foreign Application Priority Data

Aug. 27, 1996 [JP] Japan .................................. 8-244326

[51] Int. Cl.$^6$ .................................................. H04N 1/46
[52] U.S. Cl. ...................... 250/226; 250/208.1; 358/514
[58] Field of Search ................................. 250/226, 578.1, 250/208.1; 356/405; 348/269, 280, 599; 358/515, 514

[56] References Cited

U.S. PATENT DOCUMENTS

| | | | |
|---|---|---|---|
| 4,658,289 | 4/1987 | Nagano et al. | 358/75 |
| 4,812,900 | 3/1989 | Kadowaki et al. | 358/75 |
| 4,814,630 | 3/1989 | Lim | 250/578 |
| 5,218,430 | 6/1993 | Roeh | 358/11 |
| 5,304,813 | 4/1994 | De Man | 250/556 |
| 5,313,313 | 5/1994 | Sato | 358/514 |
| 5,336,878 | 8/1994 | Boyd et al. | 250/208.1 |
| 5,398,061 | 3/1995 | Miura et al. | 348/269 |
| 5,481,383 | 1/1996 | Morishima et al. | 359/15 |
| 5,753,906 | 5/1998 | Gennetten | 250/226 |

*Primary Examiner*—Edward P. Westin
*Assistant Examiner*—Thanh X. Luu
*Attorney, Agent, or Firm*—Greenblum & Bernstein P.L.C.

[57] ABSTRACT

A color image reader has a three-primary-color light source for emitting blue-light rays, red-light rays and green-light rays. The light-source is controlled such that the emissions of the blue, red and green light rays are cyclically performed in the order of the blue-light rays, the red-light rays, the green-light rays and the red-light rays. An object to be read is continuously moved, such that the object is illuminated with the cyclical emissions of the blue-light rays, red-light rays and green-light rays. A one-dimensional line image sensor optically and electronically senses a monochromatic image of the object illuminated with each of the cyclical emissions of the blue-light rays, red-light rays and green-light rays.

28 Claims, 9 Drawing Sheets

COLOR IMAGE READER

BACKGROUND OF THE INVENTION

1. Field of the Invention

The present invention relates to a color image reader using a one-dimensional line image sensor exhibiting a photoelectric conversion nature. More particularly, the present invention relates to a color image reader which optically and electronically reads an image from an object by cyclically illuminating the object with three-primary colors of light and by continuously moving either the object or the line image sensor, thereby scanning the object with the line image sensor during the cyclical illumination of the object with the three-primary colors of light.

2. Description of the Related Art

In a conventional color image reader using a one-dimensional line image sensor exhibiting a photoelectric conversion nature, such as a CCD (charge-coupled device) line image sensor, an object is intermittently moved with respect to the line image sensor, thereby scanning the object, step by step, with the line image sensor, while the object is cyclically illuminated with the three-primary colors of light, for example, red-light rays, green-light rays and blue-light rays.

In particular, at each of the scanning steps, the object is successively illuminated with the three-primary colors of light in the order of, for example, the red-light rays, the green-light rays and the blue-light rays, and the line image sensor then produces, in succession, a single-line of red image-pixel signals derived from the red-light illumination, a single-line of green image-pixel signals derived from the green-light illumination, and a single-line of blue image-pixel signals derived from the blue-light illumination. Namely, at each of the scanning steps, three single-lines of red, green and blue image-pixel signals are obtained with respect to a single scanning-line of the object. Thus, a color image of the object can be reproduced, on the basis of the three-primary color image-pixel signals obtained with respect to the scanning-lines of the object.

Nevertheless, in the conventional color image reader, a protracted period of time is required to read a color image from the object, because of the relative intermittent movement between the object and the line image sensor.

To decrease the period of time for reading a color image from the object, it has been proposed that the object is continuously moved, with respect to the line image sensor, during the cyclical illumination of the object with the three-primary color light rays, in such a manner that a single-line of red image-pixel signals derived from the red-light illumination, a single-line of green image-pixel signals derived from the green-light illumination, and a single-line of blue image-pixel signals derived from the blue-light illumination are cyclically read in succession from the line image sensor.

In this case, a color image of the object is reproduced, for example, with respect to the green scanning-lines of the object, from which the respective single-lines of green image-pixel signals are obtained. No actual single-line of red image-pixel signals and no actual single-line of blue image-pixel signals are obtained at each of the green scanning-lines of the object, because of the continuous movement of the object with respect to the line sensor.

Therefore, the single-lines of red image-pixel signals and the single-lines of blue image-pixel signals, actually obtained from the red scanning-lines and the blue scanning-lines, respectively, of the object, are used to estimate, by interpolation, single-lines of red image-pixel signals and single-lines of blue image-pixel signals which occur at the green scanning-lines, but which are not actually obtained due to the green scanning-lines only being illuminated by the green light rays. Then, by combining the green image-pixel signals, the interpolated red image-pixel signals and the interpolated blue image pixel signals, at each green scanning-line position, a color image can be reproduced.

However, the conventional interpolation processing requires improvement, because the interpolated single-lines of red image-pixel signals and the interpolated single-lines of blue image-pixel signals cannot be confidently and reasonably estimated on the basis of the actual single-lines of red image-pixel signals and the actual single-lines of blue image-pixel signals, obtained from the red scanning-lines and the blue scanning-lines, respectively, adjacent to the green scanning-lines of the object, for the reasons as discussed hereinafter in detail.

SUMMARY OF THE INVENTION

Therefore, an object of the present invention is to provide a color image reader, using a one-dimensional line image sensor exhibiting a photoelectric conversion nature, for optically and electronically reading an image from an object by cyclically illuminating the object with different monochromatic colors of light and by continuously moving either the object or the line image sensor, thereby enabling a scanning of the object with the line image sensor during the cyclical illumination of the object with the different monochromatic colors of light, wherein an interpolation processing, as mentioned above, can be confidently and reasonably carried out.

In accordance with a first aspect of the present invention, there is provided a color image reader which comprises: a light source for selectively emitting first monochromatic light rays, second monochromatic light rays and third monochromatic light rays; a light-source controller for controlling the light source; an object driver mechanism and a one-dimensional line image sensor. The light source controller controls the light source such that the emissions of the first, second and third monochromatic light rays are cyclically performed in the order of the first monochromatic light rays, the second monochromatic light rays, the third monochromatic light rays and the second monochromatic light rays. The object driver mechanism continuously moves an object in such a manner that the object is illuminated with the cyclical emissions of the first, second and third monochromatic light rays. The line image sensor optically and electronically senses a monochromatic image of the object illuminated with each of the cyclical emissions of the first, second and third monochromatic light rays.

In accordance with a second aspect of the present invention, there is provided a color image reader comprising: a light source; monochromatic light rays a one-dimensional line image sensor; and an object scanner mechanism. The light source selectively emits first monochromatic light rays, second monochromatic light rays and third monochromatic light rays. The light source controller controls the light source such that cyclical emissions of the first, second and third monochromatic light rays are performed in an order of the first monochromatic light rays, the second monochromatic light rays, the third monochromatic light rays and the second monochromatic light rays. The one-dimensioned line image sensor optically and electronically senses a monochromatic image of the object illuminated with each of the cyclical emissions of the first, second and third monochromatic light rays.

The object scanner mechanism produces a continuous relative movement between the object and the one-dimensional line image sensor in such a manner that a scanning-line, defined by an emission of the first monochromatic light rays just before an emission of the third monochromatic light rays, and another scanning-line, defined by another emission of the first monochromatic light rays just after the emission of the third monochromatic light rays, are symmetrically placed with respect to a further scanning line, defined by the emission of the third monochromatic light rays; In addition, a scanning-line, defined by an emission of the second monochromatic light rays just before the emission of the third monochromatic light rays, and another scanning-line, defined by another emission of the second monochromatic light rays just after the emission of the third monochromatic light rays, are symmetrically placed with respect to the further scanning line, defined by the emission of the third monochromatic light rays.

The color image reader may further comprise: a first interpolation calculator and a second interpolation calculator. The first interpolation calculator calculates an average between a monochromatic image data, derived from an emission of the first monochromatic light rays just before an emission of the third monochromatic light rays, and another monochromatic image data, derived from another emission of the first monochromatic light rays just after the emission of the third monochromatic light rays. The second interpolation calculator calculates an average between a monochromatic image data, derived from an emission of the second monochromatic light rays just before the emission of the third monochromatic light rays, and another monochromatic image data derived from another emission of the second monochromatic light rays just after the emission of the third monochromatic light rays.

The three-primary-color light source may include a first light emitter for emitting the first monochromatic light rays, a second light emitter for emitting the second monochromatic light rays and a third light emitter for emitting the third monochromatic light rays.

Preferably, the first monochromatic light comprises blue-light rays; the second monochromatic light comprises red-light rays; and the third monochromatic light comprises green-light rays. Also, the object may be either transparent or opaque.

BRIEF DESCRIPTION OF THE DRAWINGS

The objects and other objects of the present invention will be better understood from the following description, with reference to the accompanying drawings in which.

DESCRIPTION OF THE PREFERRED EMBODIMENTS

Figure 1:
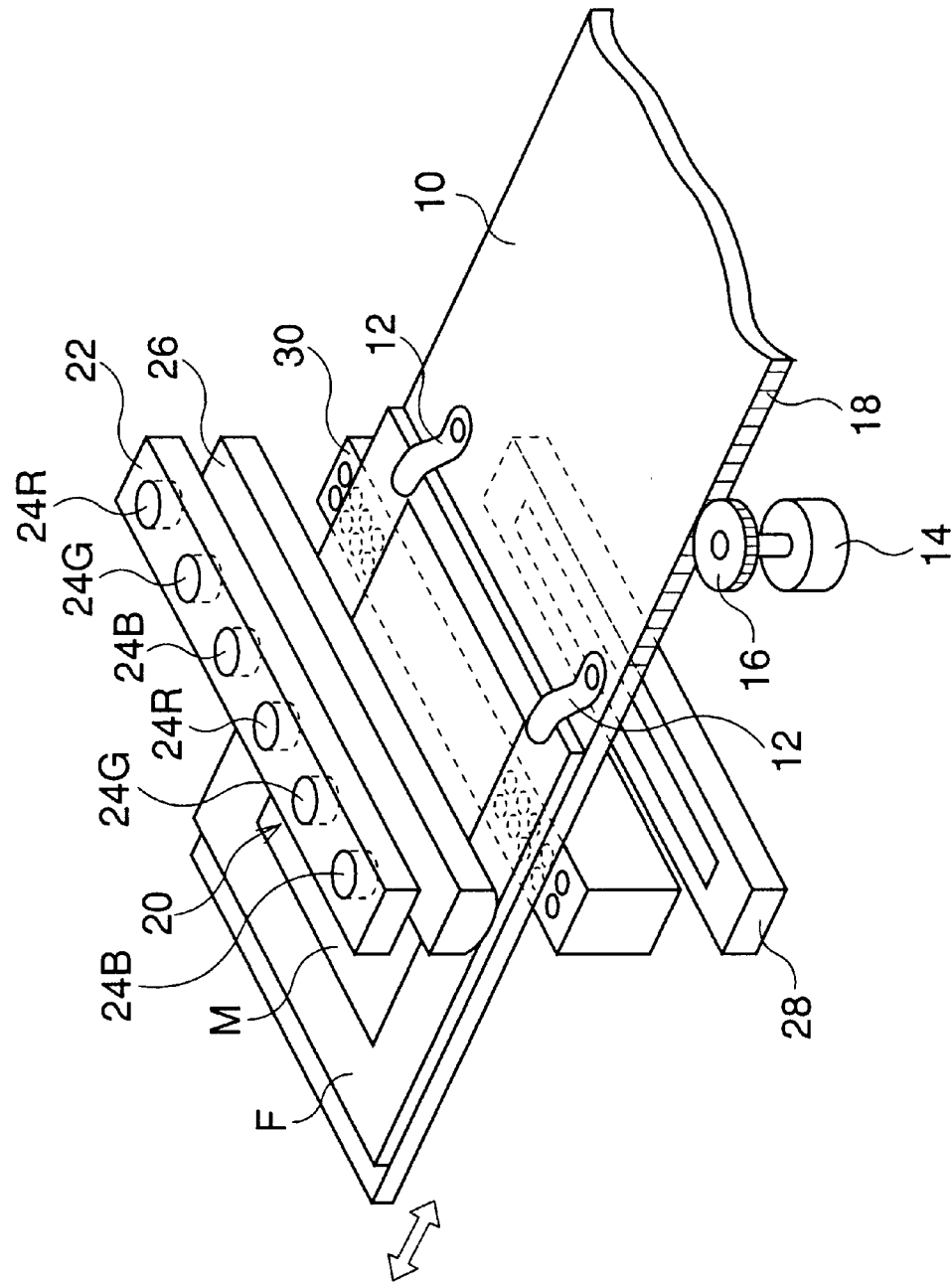
FIG. 1 is a schematic perspective view of an embodiment of a color image reader according to the present invention.

FIG. 1 schematically shows a color image reader according to the present invention, which is constituted so as to read a color image from a transparent object such as a positive transparency film, a negative transparency film or the like. Note, in FIG. 1, the transparent object is indicated by reference M, and the transparency M is held by a frame holder F.

The color image reader comprises a plate-like carriage 10 on which the frame holder F is detachably mounted. Namely, the carriage 10 is provided with a pair of spring fasteners 12 attached thereto, by which the frame holder F is releasably fastened onto the carriage 10. Although not visible in FIG. 1 due to the frame holder F being laid on the plate-like carriage 10, a rectangular opening is formed in the carriage 10, which has an opening area large enough to encompass the transparent object M.

The plate-like carriage 10 is movable in the directions indicated by an open arrow shown in FIG. 1, and the movement of the carriage 10 is carried out by a suitable drive motor 14, such as a stepping motor, a servo motor or the like. Namely, the drive motor 14 has a pinion 16, fixedly mounted on an output shaft thereof, which is meshed with a rack 18 formed on a longer side of the carriage 10.

The color image reader also comprises a light source 20, which includes an elongated frame member 22 having red-light emitters 24R, green-light emitters 24G and blue-light emitters 24B therein. Although only six light emitters (24R, 24G, 24B) are representatively shown in FIG. 1, indeed, a plurality of red-light emitters 24R, a plurality of green-light emitters 24G and a plurality of blue-light emitters 24B are held in the elongated frame member 22 and are regularly arranged therealong. Each of the light emitters may comprise a light emitting diode (LED) emitting a predetermined monochromatic light (red, green, blue).

As shown in FIG. 1, the light source 20 is arranged transversely above a path along which the carriage 10, and therefore the transparent object M, is moved. The plurality of red-light emitters 24R, the plurality of green-light emitters 24G, and the plurality of blue-light emitters 24B are cyclically turned ON in a predetermined order.

In this embodiment, firstly, the blue-light emitters 24B are turned ON, to thereby emit blue-light rays, and then the red-light emitters 24R are turned ON, to thereby emit red-light rays. Successively, the green-light emitters 24G are turned ON, to thereby emit green light rays, and then the red-light emitters 24R are turned ON, to thereby emit red-light rays. Namely, the emissions of the three-primary colors of light from the light source 20 are cyclically repeated in the order of: the blue-light emission, the red-light emission, the green-light emission and the red-light emission. Accordingly, the frequency of the red-light emissions is twice the frequency of the blue-light emissions or the green-light emissions.

The color image reader further comprises a cylindrical condenser lens 26, intervened between the light source 20 and the path of the transparent object M. The monochromatic light rays (red, green, blue), emitted from the light source 20, are condensed by the cylindrical condenser lens 26 and are directed in parallel toward the transparent object M.

Furthermore, the color image reader comprises a one-dimensional CCD line image sensor 28, and a focussing lens system 30 associated therewith. The CCD line image sensor 28 is arranged transversely below the path of the transparent object M, and is aligned with the optical axes of the elongated light source 20. In this embodiment, the focussing lens system 30 is formed as a rod lens array, and is intervened between the CCD line image sensor 28 and the path of the transparent object M. Due to the focussing lens system 30, the monochromatic light rays, passing through the transparent object M, are focussed onto a linear light-receiving surface of the CCD line image sensor 28.

Figure 2:
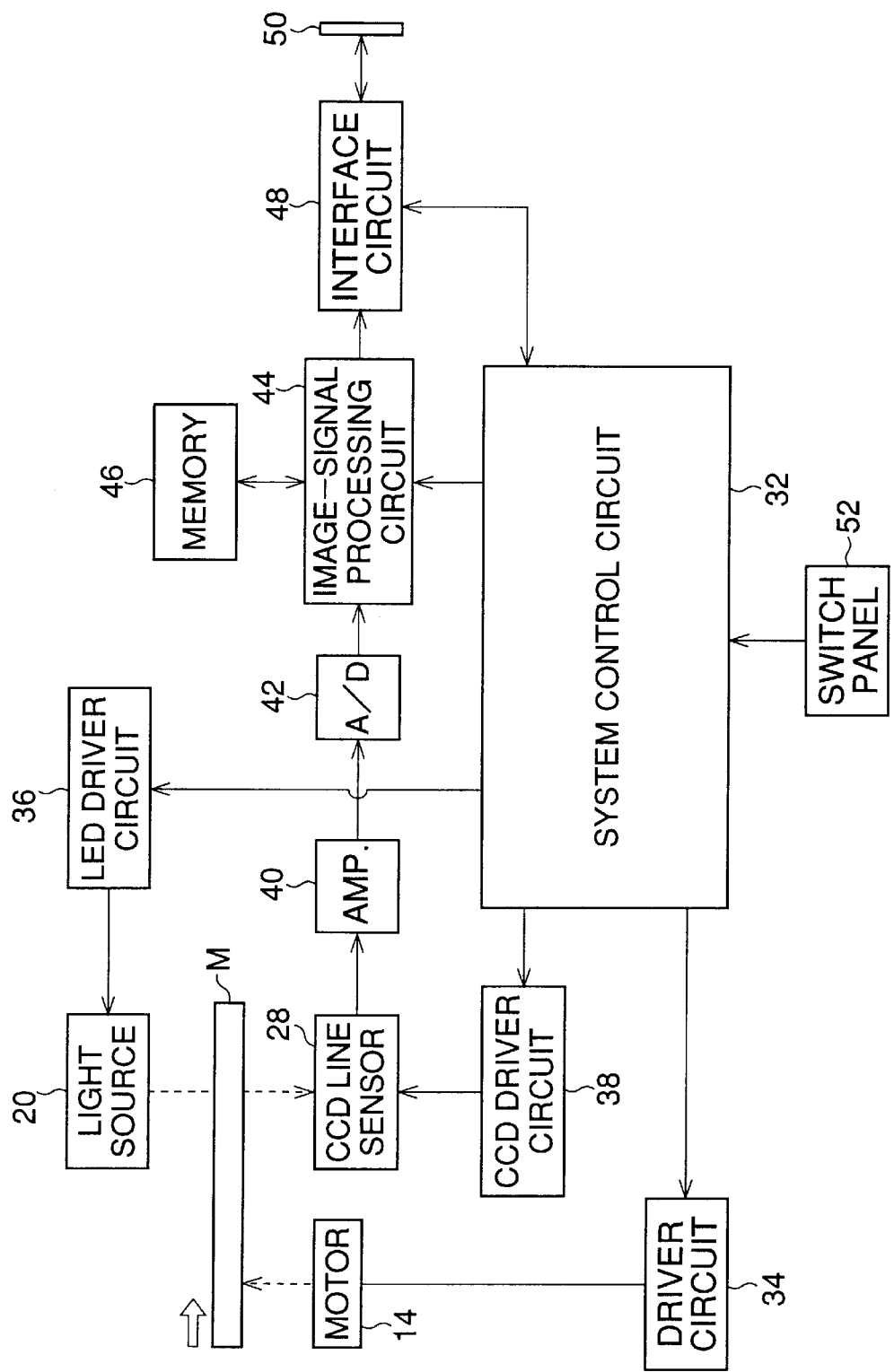
FIG. 2 is a schematic block diagram of the color image reader shown in FIG. 1.

FIG. 2 schematically shows a block diagram of the color image sensor illustrated in FIG. 1. The color image reader is provided with a system control circuit 32, which may be constituted as a microcomputer comprising a central processing unit (CPU) or processor, a read-only memory (ROM) for storing programs, constants, etc, and a random access memory (RAM) for storing temporary data.

As shown in FIG. 2, the drive motor 14 is connected to the system control circuit 32, through a driver circuit 34, and is driven on the basis of a series of drive pulses output from the driver circuit 34, which is operated by the system control circuit 32. During a reading operation of the color image reader, the drive motor 14 is driven in such a manner that the plate-like carriage 10, and therefore the transparent object M, is continuously moved to pass through a space between the cylindrical condenser lens 26 and the focussing lens system 30.

The light source 20 is connected to the system control circuit 32, via an LED driver circuit 36, and is electrically powered by the LED driver circuit 36, which is operated by the system control circuit 32. In this embodiment, the red-light emitters or red LED's 24R, the green-light emitters or green LED's 24G and the blue-light emitters or blue LED's 24B are cyclically turned ON in the manner as mentioned previously. Namely, the emissions of the three-primary colors of light from the light source 20 are cyclically repeated in the order of the blue-light emission, the red-light emission, the green-light emission and the red-light emission.

During the cyclical emissions of the three-primary colors of light, the transparent object M is illuminated with the monochromatic light rays (red, green, blue) of the colored light emitters. The monochromatic light rays concerned, having passed through the cylindrical condenser lens 26 and the transparent object M, are focussed, by the focussing lens system 30, onto the linear light-receiving surface of the CCD line image sensor 28, so that electrical charges are produced and accumulated in the CCD line image sensor 28.

The CCD line image sensor 28 is connected to the system control circuit 32, through a CCD driver circuit 38, and is then driven by the CCD driver circuit 38. Namely, the accumulated electrical charges are output, as a single-line of image-pixel signals, from the CCD line image sensor 28, by driving the CCD driver circuit 38 which is operated by the system control circuit 32.

Note, if a longitudinal direction of the CCD line image sensor 28 is defined as a main-scanning direction, the outputting of the single-line of image-pixel signals from the CCD line image sensor 28 may be defined as a main-scanning of the object image. Of course, In this case, the movement direction of the transparent object M is defined as a sub-scanning direction perpendicular to the main-scanning direction.

The single-line of image-pixel signals, output from the CCD line image sensor 28, is amplified by an amplifier 40, and is then converted into a single-line of digital image-pixel signals by an analog-to-digital (A/D) converter 42. Note, although the amplifier 40 and the A/D converter 42 are not diagrammatically connected to the system control circuit 32, these element are also controlled by the system control circuit 32.

The single-line of digital image-pixel signals, outputted from the A/D converter 42, is input to an image-signal processing circuit 44, in which the single-line of digital image-pixel signals is subjected to some processes, such as shading-correction, gamma correction processing and so on. The processed single-line of digital image-signals is initially stored in a memory 46. When the sensing or reading of the colored images from the transparent object M is completed, all of the single-lines of digital image-pixel signals for the three-primary colors, derived from the reading of the colored images from the transparent object M, are temporarily stored and held in the memory 46.

In this embodiment, a color image of the object is reproduced, based on the position of the green scanning-lines. The single-lines of green image-pixel signals are actually obtained, but, because of the continuous movement of the transparent object M with respect to the line sensor 28, no actual single-line of blue image-pixel signals and no actual single-line of red image-pixel signals are obtained at each of the green scanning-lines of the transparent object M. So, the single-line of blue image-pixel signals and the single-line of red image-pixel signals, which are required at each of the green scanning-lines of the transparent object M, are interpolated on the basis of the single-lines of red image-pixel signals and the single-lines of blue image-pixel signals actually obtained from the red scanning-lines and the blue scanning-lines, respectively, adjacent to the green scanning-lines of the transparent object M, as stated hereinafter in detail.

After the interpolation processing, the single-lines of image-pixel signals for the three-primary colors used for reproducing the color image of the transparent object M, are also stored, as a single-frame of three-primary color image data, in the memory 46. The memory 46 has a capacity for storing multiple single-frames of three-primary color image data. For example, if necessary, a single-frame of three-primary color image data can be read from the memory 46 under the control of the system control circuit 32, if external manipulation of the image data is required.

In particular, as shown in FIG. 2, the system control circuit 32 is connected to, for example, a peripheral image processing computer (not shown), through the intermediary of an interface circuit 48 and a terminal connector 50. When an image-data-transferring command signal is output from the peripheral image processing computer to the color image reader, a given single-frame of three-primary color image data is read, from the memory 46, and is subjected to a format-conversion processing and so on in the interface circuit 48. Thereafter, the single-frame of three-primary color image data is transferred from the color image reader to the peripheral image processing computer through the terminal connector 50.

Note, reference 52 indicates a switch panel on which some switches for executing various operations of the color image reader are provided.

Figure 3:
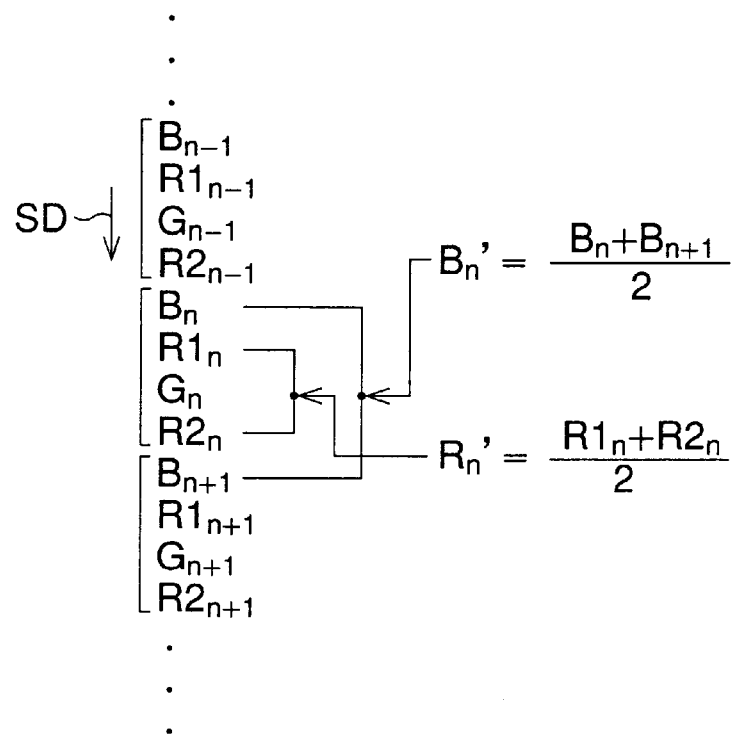
FIG. 3 is a conceptual view for explaining an interpolation processing introduced in the color image reader of FIGS. 1 and 2.

With reference to FIG. 3, which conceptually shows digital image-pixel signals of the three-primary colors ( . . . $B_{n-1}$, $R1_{n-1}$, $G_{n-1}$, $R2_{n-1}$, $B_n$, $R1_n$, $G_n$, $R2_n$, $B_{n+1}$, $R1_{n+1}$, $G_{n+1}$, $R2_{n+1}$ . . . ) aligned with each other in the scanning direction (indicated by an arrow "SD"), a principle of the interpolation processing, according to the present invention, will now be explained.

As mentioned above, in this embodiment, the emissions of the three-primary colors of light from the light source 20 are cyclically repeated in the order of the blue-light emission, the first red-light emission, the green-light emission and the second red-light emission. In FIG. 3, at each cycle of the emissions of the three-primary colors of light, the digital blue image-pixel signals derived from the blue-light emissions are represented by the references ($B_{n-1}$, $B_n$, $B_{n+1}$); the first digital red image-pixel signals derived from the red-light emissions are represented by the references ($R1_{n-1}$, $R1_n$, $R1_{n+1}$); the digital green image-pixel signals derived from the green-light emissions are represented by the references ($G_{n-1}$, $G_n$, $G_{n+1}$); and the second digital red image-pixel signals derived from the red-light emissions are represented by the references ($R2_{n-1}$, $R2_n$, $R2_{n+1}$).

Also, as mentioned above, in this embodiment, a color image of the transparent object M is reproduced based upon the position of the green scanning-lines of the transparent object M. The respective single-lines of green image-pixel signals, including ( . . . $G_{n-1}$, $G_n$, $G_{n+1}$), are obtained, but, because of the continuous movement of the transparent object M with respect to the line sensor 28, no single-line of blue image-pixel signals and no single-line of red image-pixel singles can be obtained at each of the green scanning-lines of the transparent object M.

According to this embodiment, the single-line of blue image-pixel signals and the single-line of red image-pixel signals, which are required at each of the green scanning-lines of the transparent object M, are estimated, by interpolation, on the basis of the single-lines of red image-pixel signals and the single-lines of blue image-pixel signals actually obtained from the red scanning-lines and the blue scanning-lines, respectively, adjacent to the green scanning-lines of the transparent object M.

In particular, as shown in FIG. 3, for example, the digital blue image-pixel signal $B_n'$, which is required at the digital image-pixel signal $G_n$ on the green scanning-line of the transparent object M, is calculated by the following formula:

$$B_n'=(B_n+B_{n+1})/2$$

Similarly, the digital red image-pixel signal $R_n'$, which is required at the digital image-pixel signal $G_n$ on the green scanning-line of the transparent object M, is calculated by the following formula:

$$R_n'=(R1_n+R2_n)/2$$

Figure 4:
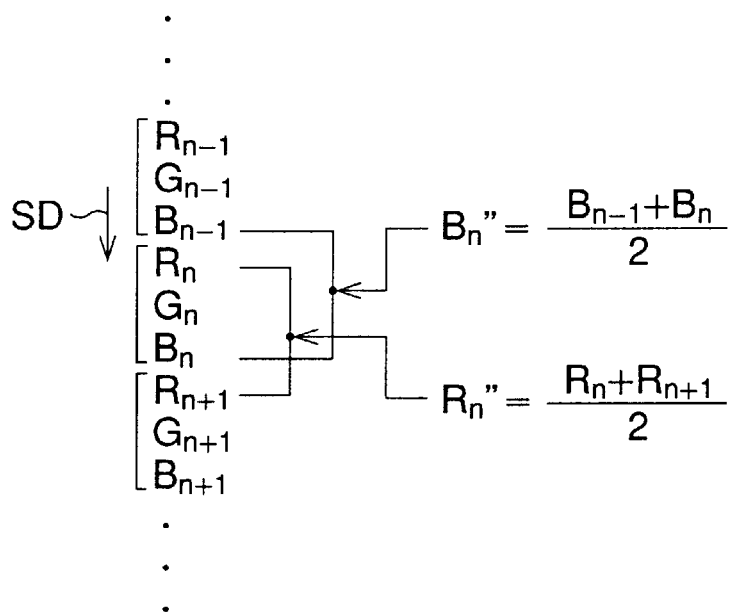
FIG. 4 is a conceptual view showing a conventional interpolation processing for comparison with the interpolation processing according to the present invention.

FIG. 4 conceptually shows, for comparison, digital image-pixel signals of the three-primary color ( . . . $R_{n-1}$, $G_{n-1}$, $B_{n-1}$, $R_n$, $G_n$, $B_n$, $R_{n+1}$, $G_{n+1}$, $B_{n+1}$ . . . ) aligned with each other in the scanning direction indicated by an arrow "SD". The digital image-pixel signals of the three-primary colors ( . . . $R_{n-1}$, $G_{n-1}$, $B_{n-1}$, $R_n$, $G_n$, $B_n$, $R_{n+1}$, $G_{n+1}$, $B_{n+1}$ . . . ) are obtained by cyclically emitting the three-primary colors of light in the order of the red-light rays, the green-light rays and the blue-light rays. In this conventional manner, an interpolation processing is carried out as below.

Digital blue image-pixel signal $B_n''$, which is required at the digital image-pixel signal $G_n$ on the green scanning-line of the transparent object M, is calculated by the following formula:

$$B_n''=(B_{n-1}+B_n)/2$$

Similarly, digital red image-pixel signal $R_n''$, which is required at the digital image-pixel signal $G_n$ on the green scanning-line of the transparent object M, is calculated by the following formula:

$$R_n''=(R_n+R_{n+1})/2$$

As is apparent from FIG. 3, the digital blue image-pixel signal $B_n'$, interpolated according to the present invention, coincides with the green scanning-line of the transparent object M, because the digital blue image-pixel signal $B_n$ and the digital blue image-pixel signal $B_{n+1}$ are symmetrically placed about the green scanning-line on which the digital green image-pixel signal $G_n$ is placed.

Similarly, the digital red image-pixel signal $R_n'$ interpolated, according to the present invention, coincides with the green scanning-line of the transparent object M, because the first digital red image-pixel signal $R1_n$ and the second digital red image-pixel signal $R2_n$ are symmetrically placed about the green scanning-line on which the digital green image-pixel signal $G_n$ is placed.

On the contrary, as is apparent from FIG. 4, the digital blue image-pixel signal $B_n''$, interpolated in the conventional manner, does not coincide with the green scanning-line of the transparent object M, because the digital blue image-pixel signal $B_{n-1}$ and the digital blue image-pixel signal $B_n$ are asymmetrically placed about the green scanning-line on which the digital green image-pixel signal $G_n$ is placed. Namely, the interpolated digital blue image-pixel signal $B_n''$ exhibits a spatial discrepancy produced with respect to the green scanning-line of the transparent object M, as shown in FIG. 4, and this spatial discrepancy occurs as a color discrepancy in a reproduced image.

Similarly, the digital red image-pixel signal $R_n''$, interpolated in the conventional manner, does not coincide with the green scanning-line of the transparent object M, because the digital red image-pixel signal $R_n$ and the digital red image-pixel signal $R_{n+1}$ are asymmetrically placed with respect to the green scanning-line on which the digital green image-pixel signal $G_n$ is placed. Also, the interpolated digital red image-pixel signal $R_n''$ exhibits a spatial discrepancy produced with respect to the green scanning-line of the transparent object M, as shown in FIG. 4, and this spatial discrepancy occurs as a color discrepancy in a reproduced image.

In short, according to this embodiment, the order of the emissions of the three-primary colors of light from the light source is prearranged in such a manner that a blue scanning-line, defined by an emission of the blue light rays just before an emission of the green light rays, and another blue scanning-line, defined by another emission of the blue light rays just after the emission of the green light rays, are symmetrically placed with respect to a green scanning line, defined by the emission of the green light rays; and that a red scanning-line, derived from an emission of the red light rays just before the emission of the green light rays, and another red scanning-line, defined by another emission of the red light rays just after the emission of the green light rays, are symmetrically placed with respect to the green scanning line, defined by the emission of the green light rays.

Therefore, according to the present invention, the interpolated digital image-pixel signals ($B_n'$, $R_n'$) exhibit no spatial discrepancy, as shown in FIG. 3. Accordingly, the interpolation processing according to the present invention is more reasonable and proper than the conventional interpolation processing.

In this embodiment, a reproduction of the object image is carried out on the basis of the green scanning lines derived from the emissions of the green light rays. This is because green light is most sensitive to a human's eyes, and because digital green image-pixel signals should have a high quality.

Figure 5:
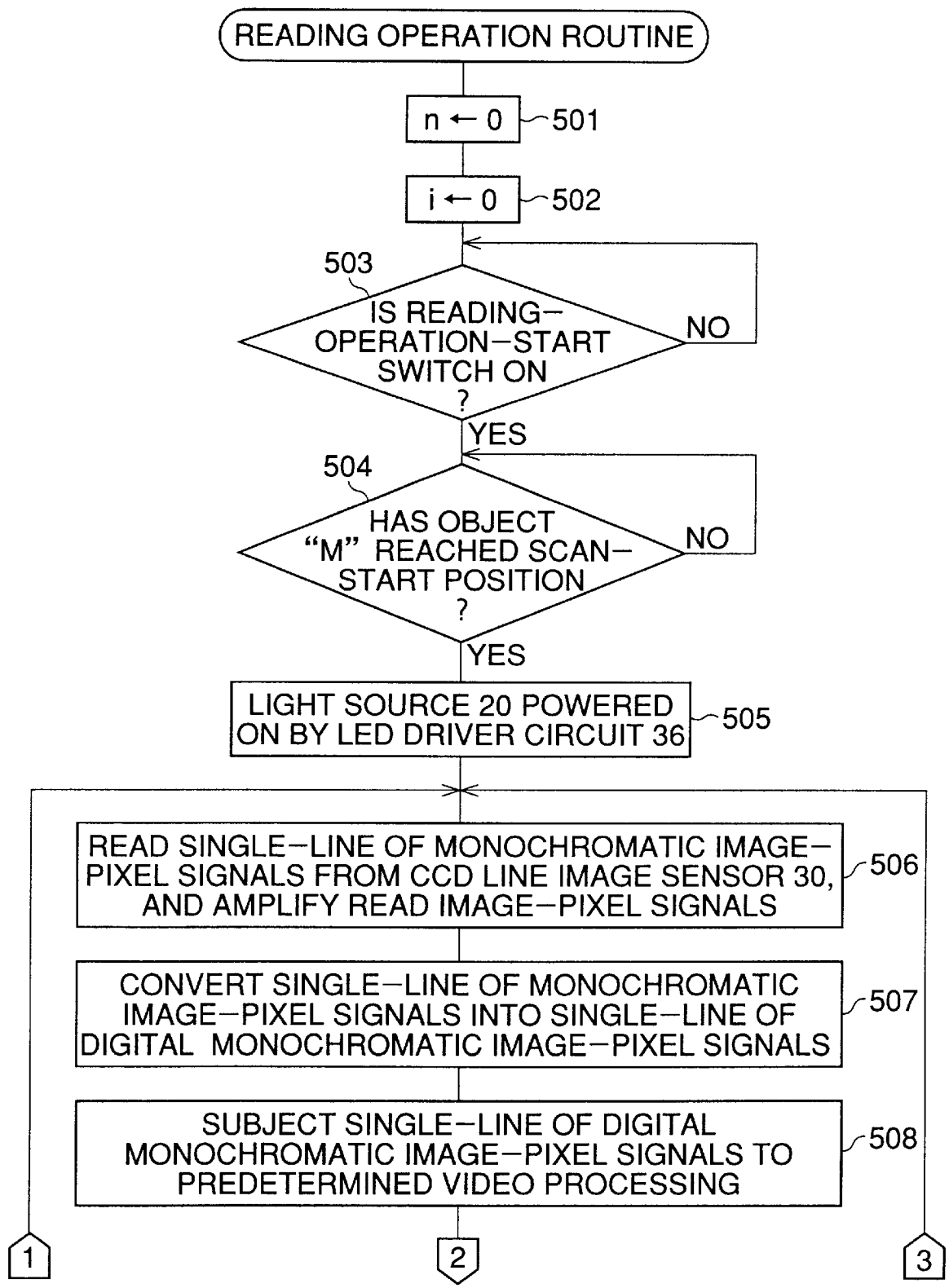
FIG. 5 is a part of a flowchart showing a reading operation routine executed in the color image reader of FIGS. 1 and 2.
Figure 6:
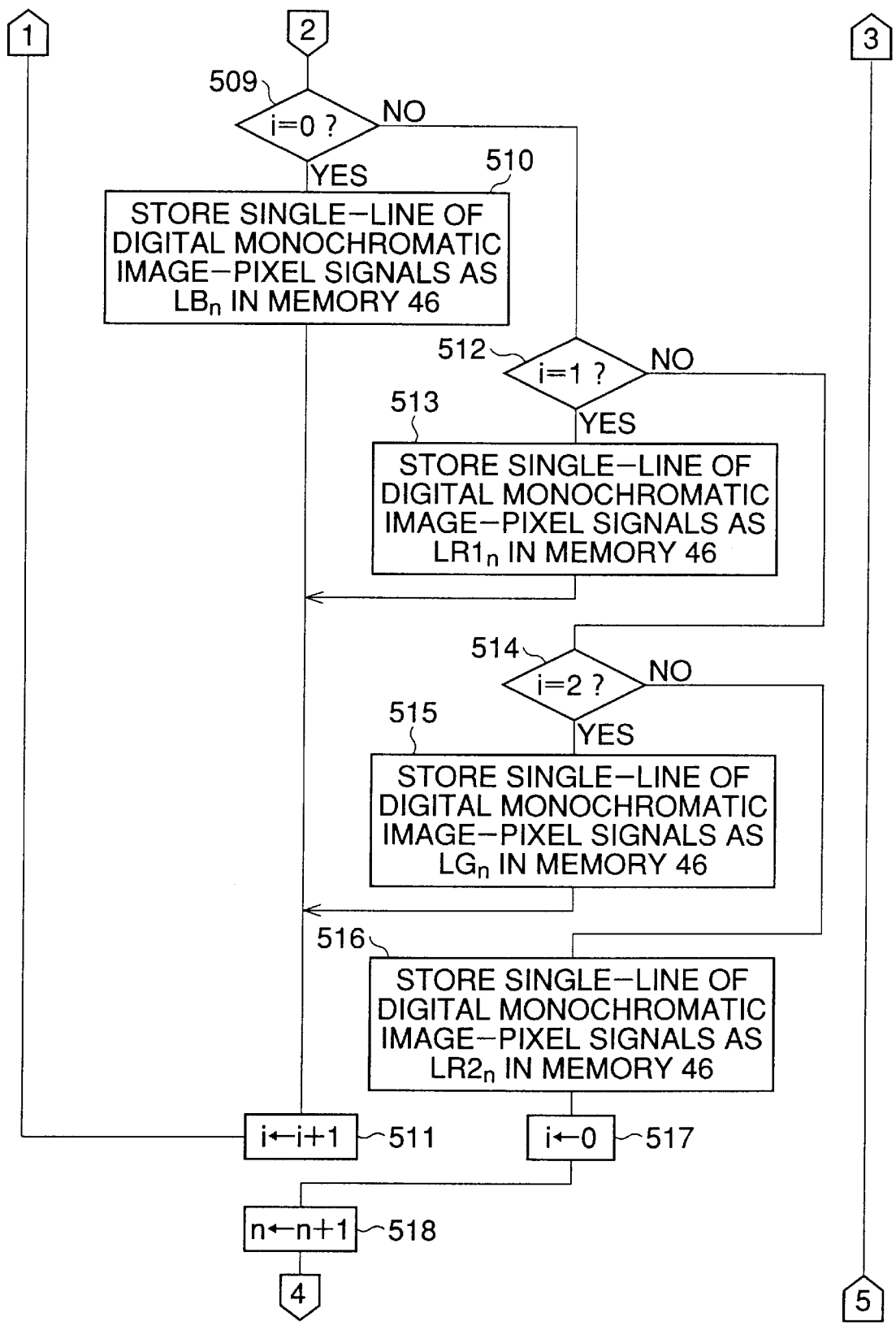
FIG. 6 is a further part of the flowchart of FIG. 5 showing a reading operation routine executed in the color image reader of FIGS. 1 and 2.
Figure 7:
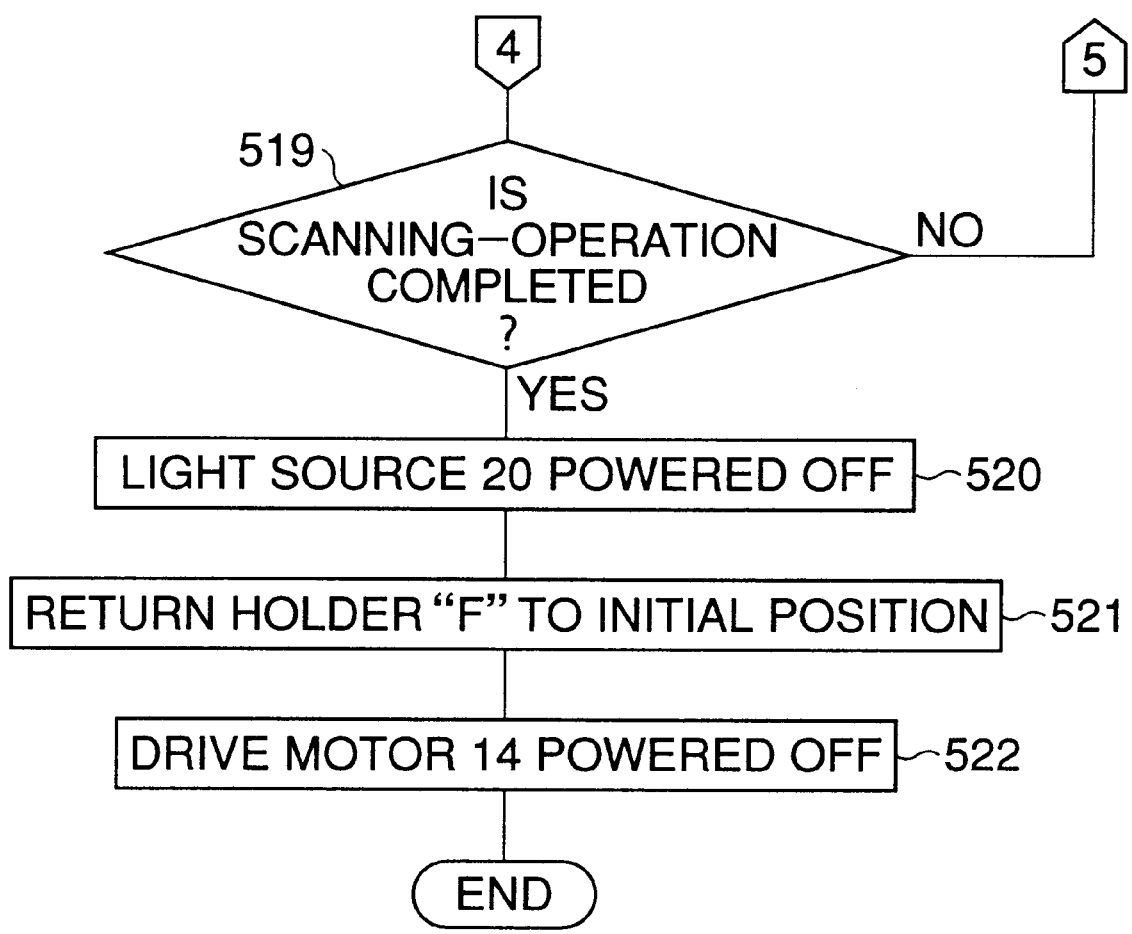
FIG. 7 is the remaining part of the flowchart started in FIG. 5 showing a reading operation routine executed in the color image reader of FIGS. 1 and 2.
Figure 8:
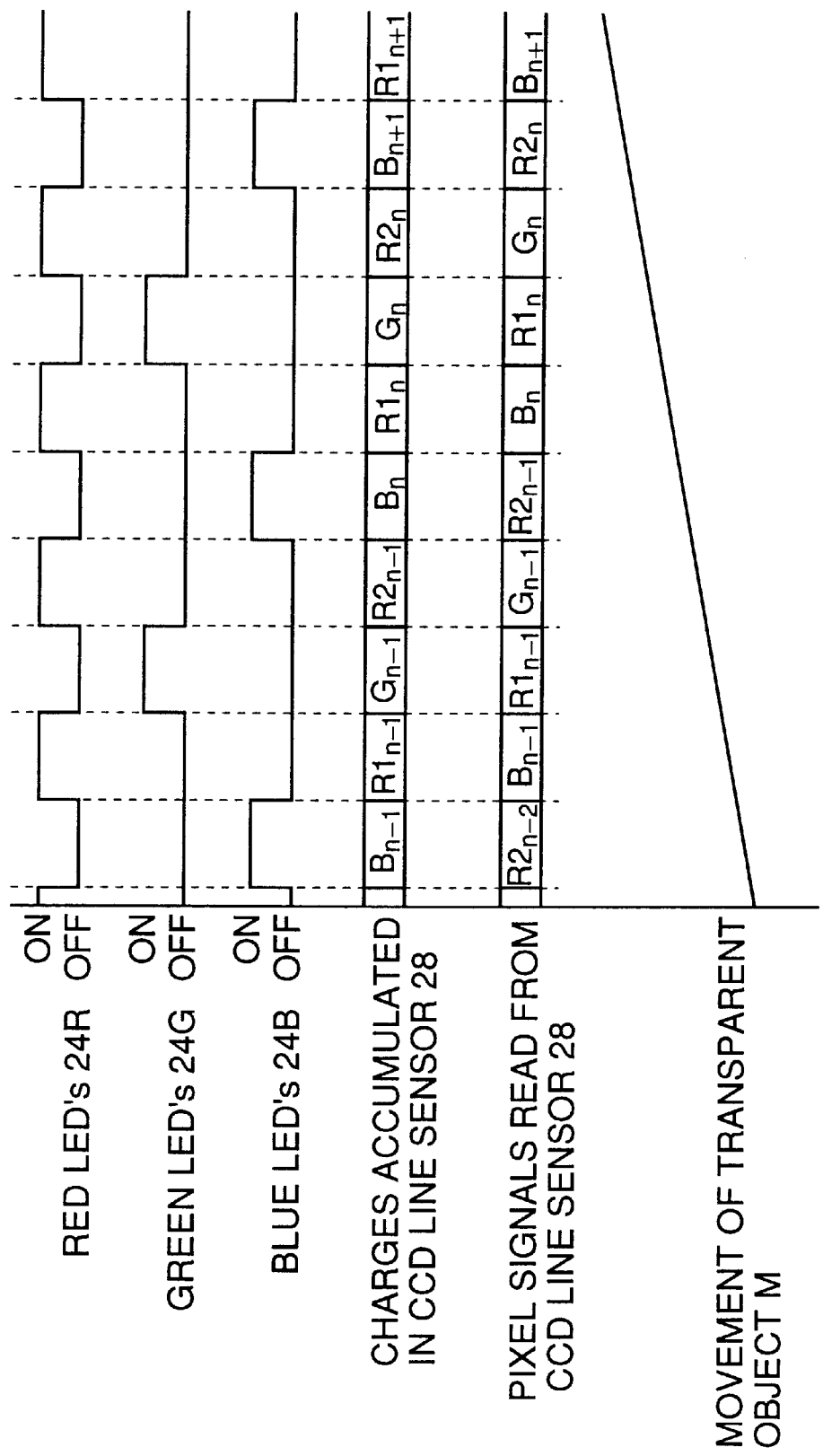
FIG. 8 is a timing chart for assisting in an explanation of the flowchart shown in FIGS. 5, 6 and 7.

FIGS. 5, 6 and 7 show a flowchart of a reading operation routine executed in the system control circuit 32 of the color image reader according to the present invention. FIG. 8 shows a timing chart for assisting in an explanation of the reading operation routine of FIGS. 5, 6 and 7.

At step 501, a counter n is reset and, at step 502, a counter i is reset. At step 503, it is monitored as to whether or not a reading-operation-start switch, provided on the switch panel 52, is turned ON. When the turn-On of the reading-operation-start switch is confirmed, the drive motor 14 is driven by the driver circuit 34, whereby the frame holder F is continuously moved along the path for the transparent object M, as shown in the timing chart of FIG. 8.

At step 504, it is monitored whether or not the transparent object M, held on the frame holder F, has reached a scan-start position. When the transparent object M reaches the scan-start position, the control proceeds to step 505, in which the light source 20 is powered ON in such a manner that the three-primary colors of light are cyclically emitted from the plurality of red LED's 24R, the plurality of green LED's 24G and the plurality of blue LED's 24B in the order of the blue light rays, the red-light rays, the green-light rays and the red-light rays. Namely, as is apparent from the timing chart of FIG. 8, the frequency of the red-light emissions is twice the frequency of the blue-light emissions or the green-light emissions.

During the emission of the blue-light, the blue-light rays pass through the cylindrical condenser lens 26 and the transparent object M, and are then focussed, via the focussing lens system 30, onto the linear light-receiving surface of the CCD line image sensor 28, so that electrical charges are produced and accumulated in the CCD line image sensor 28, as shown in the timing chart of FIG. 8.

At step 506, as soon as the emission of the blue-light rays is ended, the accumulated electrical charges are read, as a single-line of blue image-pixel signals, from the CCD line image sensor 28, by driving the CCD driver circuit 38 (as shown in the timing chart of FIG. 8), and are then amplified by the amplifier 40.

At step 507, a series of sampling clock pulses is output from the system control circuit 32 to the A/D converter 42, whereby the single-line of blue image-pixel signals is converted into a single-line of digital blue image-pixel signals. Then, at step 508, the single-line of digital blue image-pixel signals is subjected to some processes, such as shading-correction, gamma correction and so on.

At step 509, it is determined whether or not a count number of the counter i is equal to "0". At this stage, since i=0, the control proceeds to step 510, in which the processed single-line of digital blue image-pixel signals $LB_n$, derived from the blue scanning-line of the transparent object M, is stored in a memory 46.

At step 511, the count number of the counter i is incremented by "1". Then, the control returns to step 506. During the above-mentioned processing of the single-line of digital blue image-pixel signals, the red-light rays, emitted from the plurality of red LED's 24R of the light source 20, pass through the transparent object M, and are then focussed onto the linear light-receiving surface of the CCD line image sensor 28, so that electrical charges are produced and accumulated in the CCD line image sensor 28, as shown in the timing chart of FIG. 8.

At step 506, the emission of the red-light rays is ended. The accumulated electrical charges are read as a single-line of red image-pixel signals from the CCD line image sensor 28 by driving the CCD driver circuit 38 (as shown in the timing chart of FIG. 8), and are then amplified by the amplifier 40.

At step 507, a series of sampling clock pulses is output from the system control circuit 32 to the A/D converter 42, whereby the single-line of red image-pixel signals is converted into a single-line of digital red image-pixel signals. Then, at step 508, the single-line of digital red image-pixel signals is subjected to some processes, such as shading-correction, gamma correction and so on.

At step 509, it is determined whether or not the count number of the counter i is equal to "0". At this stage, since i=1, the control proceeds from step 509 to step 512, in which it is determined whether or not the count number of the counter i is equal to "1". If i is equal to "1", then the control proceeds to step 513 (i=1), in which the processed single-line of digital red image-pixel signals $LR1_n$, derived from the red scanning-line of the transparent object M, is stored in the memory 46.

Thereafter, the control proceeds from step 513 to step 511, in which the count number of the counter i is further incremented by "1". Then, the control returns to step 506. During the above-mentioned processing of the single-line of digital red image-pixel signals, the green-light rays, emitted from the plurality of green LED's 24G of the light source 20, pass through the transparent object M, and are then focussed onto the linear light-receiving surface of the CCD line image sensor 28, so that electrical charges are produced and accumulated in the CCD line image sensor 28, as shown in the timing chart of FIG. 8.

At step 506, the emission of the green-light rays is ended, the accumulated electrical charges are read, as a single-line of green image-pixel signals from the CCD line image sensor 28 by driving the CCD driver circuit 38 (as shown in timing chart of FIG. 8), and are then amplified by the amplifier 40.

At step 507, a series of sampling clock pulses is output from the system control circuit 32 to the A/D converter 42, whereby the single-line of green image-pixel signals is converted into a single-line of digital green image-pixel signals. Then, at step 508, the single-line of digital green image-pixel signals is subjected to some processes such as shading-correction, gamma correction and so on.

At step 509, it is determined whether or not the count number of the counter i is equal to "0". At this stage, since i=2, the control proceeds from step 509 to step 514 through step 512. At step 514, it is determined whether or not the count number of the counter i is equal to "2". If i is equal to "2", the control proceeds from step 514 to step 515 (i=2), in which the processed single-line of digital green image-pixel signals $LG_n$, derived from the green scanning-line of the transparent object M, is stored in the memory 46.

Thereafter, the control proceeds from step 515 to step 511, in which the count number of the counter i is again incremented by "1". Then, the control returns to step 506. During the above-mentioned processing of the single-line of digital green image-pixel signals, the red-light rays are again emitted from the plurality of red LED's 24R of the light source 20, pass through the transparent object M, and are then focussed onto the linear light-receiving surface of the CCD line image sensor 28, so that electrical charges are produced and accumulated in the CCD line image sensor 28, as shown in the timing chart of FIG. 8.

At step 506, the emission of the red-light rays is ended, the accumulated electrical charges are read, as a single-line of red image-pixel signals from the CCD line image sensor 28 by driving the CCD driver circuit 38 (as shown in the timing chart of FIG. 8), and are then amplified by the amplifier 40.

At step 507, a series of sampling clock pulses is output from the system control circuit 32 to the A/D converter 42, whereby the single-line of red image-pixel signals is converted into a single-line of digital red image-pixel signals. Then, at step 508, the single-line of digital red image-pixel signals is subjected to some processes, such as shading-correction, gamma correction and so on.

At step 509, it is determined whether or not the count number of the counter i is equal to "0". At this stage, since i=3, the control proceeds from step 509 to step 516 through steps 512 and 514. At step 516, the processed single-line of digital red image-pixel signals $LR2_n$, derived from the red scanning-line of the transparent object M, is stored in the memory 46.

Thereafter, the control proceeds to step 517, in which the counter i is reset to 0 and, at step 518, a count number of the counter n is incremented by "1". Then, the control proceeds to step 519 (FIG. 7), in which it is determined whether or not the scanning operation of the transparent object M with the CCD line image sensor 28 has been completed. Namely, in step 519, it is determined whether or not the count number of the counter n reaches a predetermined number (for example, 1199 lines to be scanned) representing a scanning range. If the scanning operation has not yet been completed, the control returns to step 506. The routine, including steps 506 to 519, is repeated until the scanning operation is completed.

When the scanning operation is completed, i.e., when all of the single-lines of image-pixels signals for the three-primary colors are stored in the memory 46, the control proceeds from step 519 to step 520, in which the light source 20 is powered OFF. Then, at step 512, the frame holder F is returned to an initial position, by driving the drive motor 14 in reverse, and, at step 522, the drive motor 14 is stopped.

Figure 9:
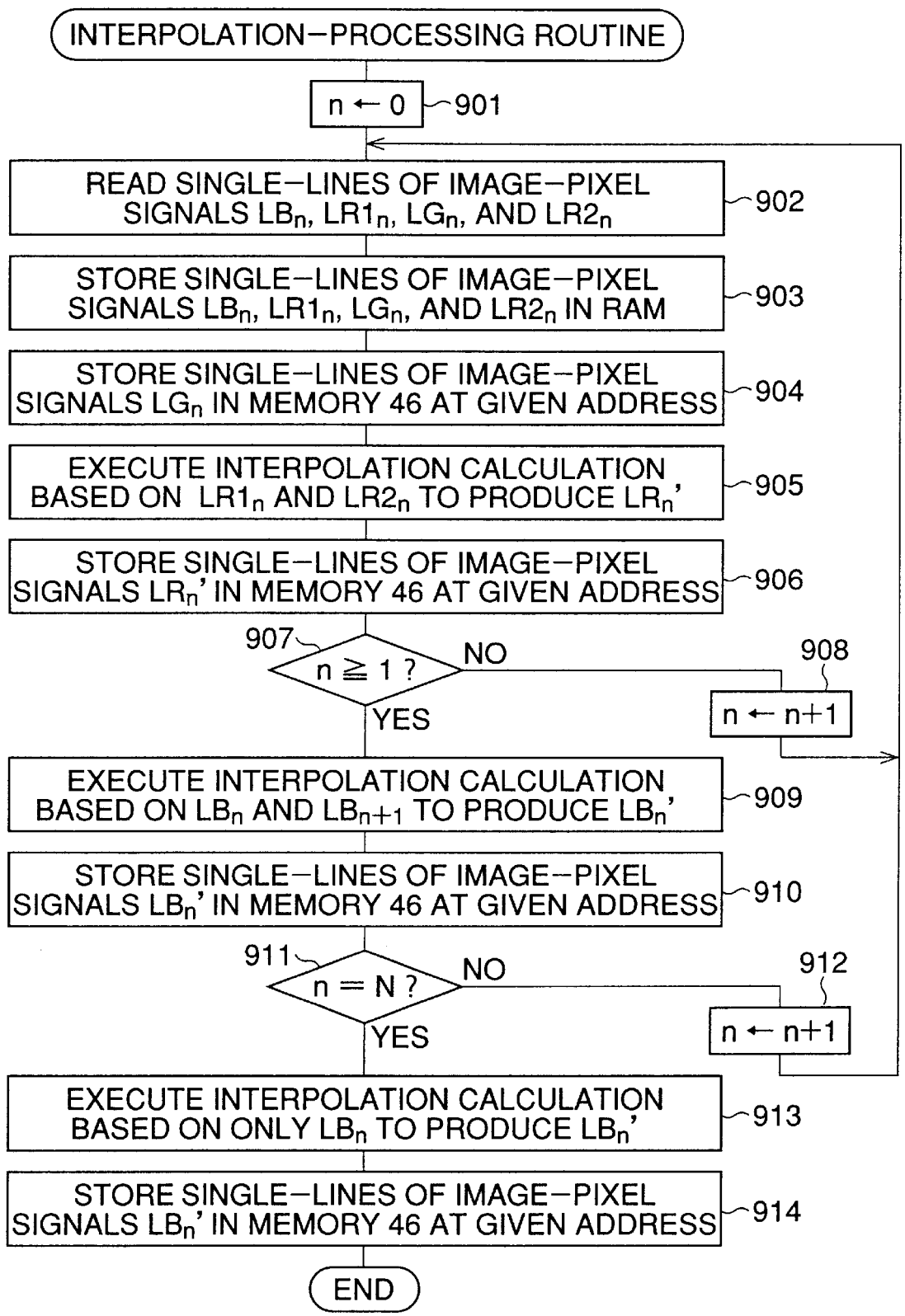
FIG. 9 is a flowchart showing an interpolation-processing routine executed in the color image reader of FIGS. 1 and 2.

FIG. 9 shows a flowchart of an interpolation-processing routine, which is executed in the system control circuit 32 of the color image reader after a reading operation routine as shown in FIGS. 5 to 7 is completed.

At step 901, a counter n is reset. Then, at step 902, the single-line of blue image-pixel signals $LB_{(n=0)}$, the single-line of red image-pixel signals $LR1_{(n=0)}$, the single-line of green image-pixel signals $LG_{(n=0)}$ and the single-line of blue image-pixel signals $LR2_{(n=0)}$ are read from the memory 46. At step 903, these single-lines of image-pixel signals $LB_{(n=0)}$, $LR1_{(n=0)}$, $LG_{(n=0)}$ and $LR2_{(n=0)}$ are temporarily stored in the RAM of the system control circuit 32.

At step 904, the single-line of green image-pixel signals $LG_{(n=0)}$ are stored in the memory 46 at a given address thereof. Then, at step 905, an interpolation calculation is executed on the basis of the single-lines of red image-pixel signals $LR1_{(n=0)}$ and $LR2_{(n=0)}$, as shown in FIG. 3, to thereby produce a single-line of red image-pixel signals $LR_{(n=0)}'$ positionally based on the green scanning-line of the single-line of green image-pixel signals $LG_{(n=0)}$. Note, in FIG. 3, one of the red image-pixel signals $LR_{(n=0)}'$ is representatively indicated by reference $R_n'$.

At step 906, the single-line of red image-pixel signals $LR_{(n=0)}'$ is stored in the memory 46 at a given address thereof. Then, at step 907, it is determined whether or not a count number of the counter n is equal to or greater than "1". At this stage, since n=0, the control proceeds from step 907 to step 908, in which the count number of the counter n is incremented by "1". Thereafter, the control returns to step 902.

At step 902, the single-line of blue image-pixel signals $LB_{(n=1)}$, the single-line of red image-pixel signals $LR1_{(n=1)}$, the single-line of green image-pixel signals $LG_{(n=1)}$ and the single-line of blue image-pixel signals $LR2_{(n=1)}$ are read from the memory 46. At step 903, these single-lines of image-pixel signals $LB_{(n=1)}$, $LR1_{(n=1)}$, $LG_{(n=1)}$ and $LR2_{(n=1)}$ are temporarily stored in the RAM of the system control circuit 32.

At step 904, the single-line of green image-pixel signals $LG_{(n=1)}$ are stored in the memory 46 at a given address thereof. Then, at step 905, an interpolation calculation is executed on the basis of the single-lines of red image-pixel signals $LR1_{(n=1)}$ and $LR2_{(n=1)}$, to thereby produce a single-line of red image-pixel signals $LR_{(n=1)}'$ positionally based on the green scanning-line of the single-line of green image-pixel signals $LG_{(n=1)}$.

At step 906, the single-line of the red image-pixel signals $LR_{(n=1)}'$ is stored in the memory 46 at a given address thereof. Then, at step 907, it is determined whether or not a count number of the counter n is equal to or greater than "1". At this stage, since n=1, the control proceeds from step 907 to step 909, in which an interpolation calculation is executed on the basis of the single-lines of blue image-pixel signals $LB_{(n=0)}$ and $LB_{(n=1)}$, as shown in FIG. 3, to thereby produce a single-line of blue image-pixel signals $LB_{(n=0)}'$ positionally based on the green scanning-line of the single-line of green image-pixel signals $LG_{(n=0)}$. Note, in FIG. 3, one of the blue image-pixel signals $LB_{(n=0)}'$ is representatively indicated by reference $B_n'$.

At step 910, the single-line of blue image-pixel signals $LB_{(n=0)}'$ is stored in the memory 46 at a given address thereof. Then, at step 911, it is determined whether or not the count number of the counter n is equal to N. Note, reference N indicates a numerical value corresponding to one-quarter of the total number of scanning-lines of the transparent object M.

If n<N, the control proceeds from step 911 to step 912, in which the count number of the counter n is further incremented by "1". Thereafter, the control returns to step 902. Namely, the routine including step 902 to 912 is repeated until the count number of the counter n is counted up to the numerical value N.

At step 911, if n=N, the control proceeds from step 911 to step 913, in which an interpolation calculation is conveniently executed on the basis of only the single-line of blue image-pixel signals $LB_{(n=N)}$, because there is no single-line of blue image-pixel signals $LB_{(n=N+1)}$. Namely, the single-line of blue image-pixel signals $LB_{(n=N)}$ is handled as a single-line of blue image-pixel signals $LB_{(n=N)}'$. Then, at step 914, the single-line of blue image-pixel signals $LB_{(n=N)}'$ is stored in the memory 46 at a given address thereof.

Thus, in the memory 46, the single-lines of image-pixel signals for the three-primary colors, necessary for reproducing a color image of the transparent object M, are stored as a single-frame of three-primary color image-pixel data. As already stated, the single-frame of three-primary color image data can be read from the memory 46, if necessary, and is then subjected to a format-conversion processing and so on in the interface circuit 48. Thereafter, the single-frame of three-primary color image data is transferred from the color image reader to, for example, a peripheral image processing computer through the terminal connector 50.

Figure 10:
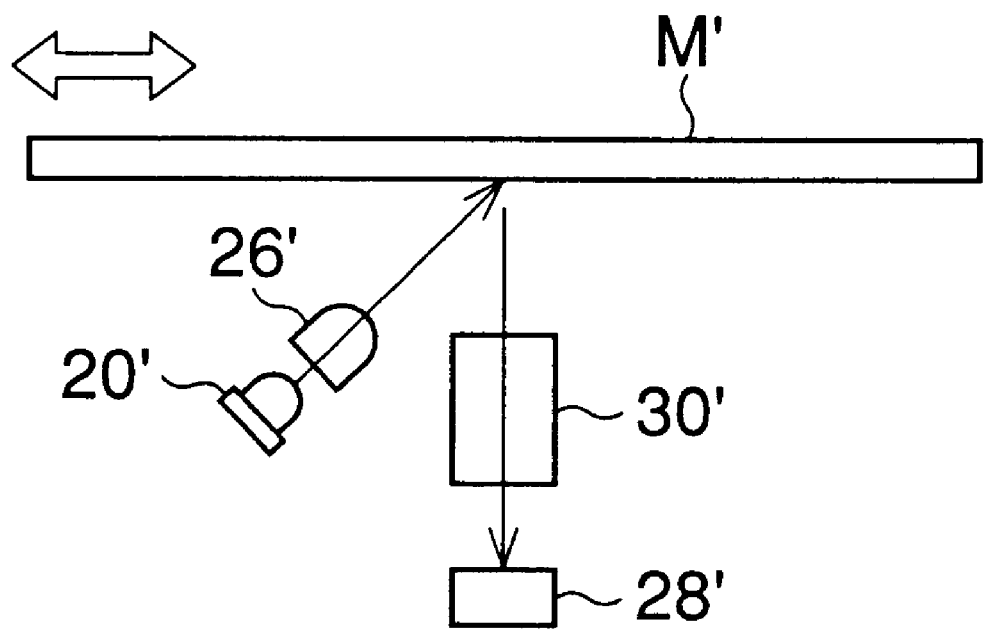
FIG. 10 is a partial schematic view of another embodiment of the color image reader according to the present invention.

FIG. 10 shows another embodiment of the color image reader according to the present invention, which is arranged such that a color image is optically and electronically read from an opaque object M'. During a reading operation, the opaque object M is continuously moved along a predetermined path. As shown in FIG. 10, a light source 20', a cylindrical condenser lens 26', a focussing lens system 30' and a CCD line image sensor 28' are placed on the same side of the path of the opaque object M.

Although the light source 20' is symbolically shown as a light emitting diode (LED), the light source 20' is arranged so as to cyclically emit three-primary color light rays in the order of, for example, blue-light rays, red-light rays, green-light rays and red-light rays, as in the case of the above-mentioned embodiment.

During the cyclical emissions of the three-primary colors of light, the opaque object M' is illuminated with the monochromatic lights rays (red, green, blue). The monochromatic light rays concerned are reflected by the opaque object M', and are then focussed, through the focussing lens system 30', onto a linear light-receiving surface of the CCD line image sensor 28', so that electrical charges are produced and accumulated in the CCD line image sensor 28'.

It should be understood that the interpolation processing, explained with reference to FIG. 3, can be equivalently introduced in the color image reader as shown in FIG. 10, similar to the above-mentioned embodiment.

Finally, it will be understood by those skilled in the art that the foregoing description is of the preferred embodiments of the device and that various changes and modifications may be made to the present invention without departing from the spirit and scope thereof.

The present disclosure relates to subject matter contained in Japanese Patent Application No. 8-244326 (filed on Aug. 27, 1996), which is expressly incorporated herein, by reference, in its entirety.

I claim:

1. A color image reader comprising:
   a light source for selectively emitting first monochromatic light rays, second monochromatic light rays and third monochromatic light rays;
   a light-source controller for controlling said light source such that cyclical emissions of said first, second and third monochromatic light rays are performed in an order of said first monochromatic light rays, said second monochromatic light rays, said third monochromatic light rays and said second monochromatic light rays;
   an object driver mechanism for continuously moving an object so that said object is illuminated with said cyclical emissions of said first, second and third monochromatic light rays; and
   a one-dimensional line image sensor for optically and electronically sensing a monochromatic image of said object illuminated with each of the cyclical emissions of said first, second and third monochromatic light rays.

2. The color image reader of claim 1, wherein said light source includes a first light emitter for emitting said first monochromatic light rays, a second light emitter for emitting said second monochromatic light rays and a third light emitter for emitting said third monochromatic light rays.

3. The color image reader of claim 1, wherein said first monochromatic light rays consist of blue-light rays; said second monochromatic light rays consist of red-light rays; and said third monochromatic light rays consist of green-light rays.

4. The color image reader of claim 1, wherein said object comprises a transparent object.

5. The color image reader of claim 1, wherein said object comprises an opaque object.

6. The color image reader of claim 1, wherein said one-dimensional line image sensor comprises a solid image sensor exhibiting a photoelectric conversion nature.

7. The color image reader of claim 1, further comprising:
   a first interpolation calculator for calculating an average between first monochromatic image data, derived from an emission of said first monochromatic light rays just before an emission of said third monochromatic light rays, and second monochromatic image data, derived from another emission of said first monochromatic light rays just after the emission of said third monochromatic light rays; and
   a second interpolation calculator for calculating an average between third monochromatic image data, derived from an emission of said second monochromatic light rays just before the emission of said third monochromatic light rays, and fourth monochromatic image data, derived from another emission of said second monochromatic light rays just after the emission of said third monochromatic light rays.

8. A color image reader comprising:
   a light source for selectively emitting first monochromatic light rays, second monochromatic light rays and third monochromatic light rays;
   a light-source controller for controlling said light source such that cyclical emissions of said first, second and third monochromatic light rays are performed in an order of said first monochromatic light rays, said second monochromatic light rays, said third monochromatic light rays and said second monochromatic light rays;
   a one-dimensional line image sensor for optically and electronically sensing a monochromatic image of said object illuminated with each of said cyclical emissions of said first, second and third monochromatic light rays; and
   an object scanner mechanism for producing a continuous relative movement between said object and said one-dimensional line image sensor so that a scanning-line, defined by an emission of said first monochromatic light rays just before an emission of said third monochromatic light rays, and another scanning-line, defined by another emission of said first monochromatic light rays just after the emission of said third monochromatic light rays, are symmetrically placed with respect to a further scanning line, derived from the emission of said third monochromatic light rays, and that a scanning-line, defined by an emission of said second monochromatic light rays just before the emission of said third monochromatic light rays and another scanning-line, defined by another emission of said second monochromatic light rays just after the emission of said third monochromatic light rays, are symmetrically placed with respect to the further scanning line, defined by the emission of said third monochromatic light rays.

9. The color image reader of claim 8, wherein said light source includes a first light emitter for emitting said first monochromatic light rays, a second light emitter for emitting said second monochromatic light rays and third light emitter for emitting said third monochromatic light rays.

10. The color image reader of claim 8, wherein said first monochromatic light rays consist of blue-light rays; said second monochromatic light rays consist of red-light rays; and said third monochromatic light rays consist of green-light rays.

11. The color image reader of claim 8, wherein said object comprises a transparent object.

12. The color image reader of claim 8, wherein said object comprises an opaque object.

13. The color image reader of claim 8, wherein said one-dimensional line image sensor comprises a solid image sensor exhibiting a photoelectric conversion nature.

14. The color image reader of 8, further comprising:
   a first interpolation calculator for calculating an average between first monochromatic image data, derived from the emission of said first monochromatic light rays just before the emission of said third monochromatic light rays, and second monochromatic image data, derived from another emission of said first monochromatic light rays just after the emission of said third monochromatic light rays; and
   a second interpolation calculator for calculating an average between third monochromatic image data, derived from the emission of said second monochromatic light rays just before the emission of said third monochromatic light rays and fourth monochromatic image data, derived from the other emission of said second monochromatic light rays just after the emission of said third monochromatic light rays.

15. A color image reader comprising:
   light source means for selectively emitting first monochromatic light rays, second monochromatic light rays and third monochromatic light rays;
   light-source controller means for controlling said light source means such that cyclical emissions of said first, second and third monochromatic light rays are performed in an order of said first monochromatic light rays, said second monochromatic light rays, said third monochromatic light rays and said second monochromatic light rays;
   object driver means for continuously moving an object so that said object is illuminated with said cyclical emissions of said first, second and third monochromatic light rays; and
   one-dimensional line image sensor means for optically and electronically sensing a monochromatic image of said object illuminated with each of the cyclical emissions of said first, second and third monochromatic light rays.

16. The color image reader of claim 15, wherein said light source means includes first light emitter means for emitting said first monochromatic light rays, second light emitter means for emitting said second monochromatic light rays and third light emitter means for emitting said third monochromatic light rays.

17. The color image reader of claim 15, wherein said first monochromatic light rays consist of blue-light rays; said second monochromatic light rays consist of red-light rays; and said third monochromatic light rays consist of green-light rays.

18. The color image reader of claim 15, wherein said object comprises a transparent object.

19. The color image reader of claim 15, wherein said object comprises an opaque object.

20. The color image reader of claim 15, wherein said one-dimensional line image sensor means comprises a solid image sensor exhibiting a photoelectric conversion nature.

21. The color image reader of claim 15, further comprising:
   first interpolation calculator means for calculating an average between first monochromatic image data, derived from an emission of said first monochromatic light rays just before an emission of said third monochromatic light rays, and second monochromatic image data, derived from another emission of said first monochromatic light rays just after the emission of said third monochromatic light rays; and
   second interpolation calculator means for calculating an average between second monochromatic image data, derived from an emission of said second monochromatic light rays just before the emission of said third monochromatic light rays, and fourth monochromatic image data derived from an emission of said second monochromatic light rays just after the emission of said third monochromatic light rays.

22. A color image reader comprising:
   light source means for selectively emitting first monochromatic light rays, second monochromatic light rays and third monochromatic light rays;
   light-source controller means for controlling said light source means such that cyclical emissions of said first, second and third monochromatic light rays are performed in an order of said first monochromatic light rays, said second monochromatic light rays, said third monochromatic light rays and said second monochromatic light rays;
   one-dimensional line image sensor means for optically and electronically sensing a monochromatic image of said object illuminated with each of the cyclical emissions of said first, second and third monochromatic light rays; and
   object scanner means for producing a continuous relative movement between said object and said one-dimensional line image sensor means so that a scanning-line, defined by an emission of said first monochromatic light rays just before emission of said third monochromatic light rays, and another scanning-line, defined by another emission of said monochromatic light rays just after the emission of said third monochromatic light rays, are symmetrically placed with respect to a further scanning line, defined by the emission of said third monochromatic light rays, and that a scanning-line, defined by an emission of the second monochromatic light rays just before the emission of said third monochromatic light rays, and another scanning-line, defined by another emission of said second monochromatic light rays just after the emission of said third monochromatic light rays, are symmetrically placed with respect to the further scanning line, derived from the emission of said third monochromatic light rays.

23. The color image reader of claim 22, wherein said light source means includes first light emitter means for emitting said first monochromatic light rays, second light emitter means for emitting said second monochromatic light rays and third light emitter means for emitting said third monochromatic light rays.

24. The color image reader of claim 22, wherein said first monochromatic light rays consist of blue-light rays; said second monochromatic light rays consist of red-light rays; and said third monochromatic light rays consist of green-light rays.

25. The color image reader of claim 22, wherein said object comprises a transparent object.

26. The color image reader of claim 22, wherein said object comprises an opaque object.

27. The color image reader of claim 22, wherein said one-dimensional line image sensor means comprises solid image sensor means exhibiting a photoelectric conversion nature.

28. The color image reader of claim 22, further comprising:

first interpolation calculator means for calculating an average between first monochromatic image data, derived from the emission of said first monochromatic light rays just before the emission of said third monochromatic light rays, and second monochromatic image data, derived from another emission of said first monochromatic light rays just after the emission of said third monochromatic light rays; and second interpolation calculator means for calculating an average between third monochromatic image data, derived from the emission of said second monochromatic light rays just before the emission of said third monochromatic light rays, and fourth monochromatic image data, derived from another emission of said second monochromatic light rays just after the emission of said third monochromatic light rays.

* * * * *